United States Patent [19]

Wilson

[11] 3,899,460

[45] Aug. 12, 1975

[54] 2-(PIPERIDINODITHIO)BENZOTHIAZOLES

[75] Inventor: Joan L. Wilson, Akron, Ohio

[73] Assignee: The Goodyear Tire & Rubber Company, Akron, Ohio

[22] Filed: Nov. 26, 1973

[21] Appl. No.: 419,184

Related U.S. Application Data

[63] Continuation of Ser. No. 186,544, Oct. 4, 1971, abandoned.

[52] U.S. Cl. ... 260/293.57; 260/293.58; 260/293.6; 260/784; 260/785
[51] Int. Cl. .......................................... C07d 277/78
[58] Field of Search .............................. 260/293.57

[56] References Cited
UNITED STATES PATENTS

| | | | |
|---|---|---|---|
| 2,768,988 | 10/1956 | Christensen et al. | 260/786 |
| 2,835,670 | 5/1958 | Hardman | 260/247.1 |
| 2,850,496 | 9/1958 | Hardman | 260/247.1 |
| 3,070,599 | 12/1962 | Hendry et al. | 260/247.1 |
| 3,086,018 | 4/1963 | Hardman | 260/247.1 |
| 3,147,256 | 9/1964 | Brock et al. | 260/247.1 |
| 3,467,621 | 9/1969 | Summers | 260/41.5 |
| 3,532,693 | 10/1970 | Sullivan et al. | 260/247.1 |
| R19,286 | 8/1934 | Zaucker et al. | 18/53 |

FOREIGN PATENTS OR APPLICATIONS 464,026  4/1937  United Kingdom

Primary Examiner—G. Thomas Todd
Attorney, Agent, or Firm—F. W. Brunner; J. P. Ward

[57] ABSTRACT

The invention relates to compositions of matter corresponding to the general formula

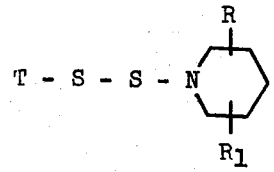

where R is selected from the group consisting of alkyl, cycloalkyl and alkaryl radicals; $R_1$ is selected from the group consisting of hydrogen and a radical as defined by R and where T is selected from a group consisting of thiazolyl, benzothiazolyl, benzoxazolyl and benzimidazolyl radicals and wherein T may be substituted with one or more radicals selected from the group consisting of R as defined above and aryl radicals containing from 6 to 12 carbon atoms and the use of these materials as delayed action accelerators and curatives.

4 Claims, No Drawings

2-(PIPERIDINODITHIO)BENZOTHIAZOLES

This is a continuation of application Ser. No. 186,544, filed Oct. 4, 1971, now abandoned.

This invention relates to improvements in both the sulfurless and sulfur vulcanization of rubbers. More particularly this invention relates to new compositions of matter useful in both the sulfurless and sulfur vulcanization of rubber which provides excellent scorch resistance during the processing of the rubber and which provide rubber products having high resistance to deterioration by heat and oxidation.

It is well known by those skilled in the art that the use of certain organic accelerators in combination with low concentrations of sulfur or in the total absence of sulfur will produce rubber products having high resistance to deterioration by heat and oxidation. It is also well known that curing systems of this nature are not in general use because of the tendency of these curing systems to induce processing difficulties in rubber compounds known as premature cure or "scorch". It is further well known that present day rubber compounds must have substantial resistance to scorch in order to be safely processed in modern rubber equipment. Tendencies in the rubber industry today have been toward the use of materials which will eliminate the heat and energy generated during processing without causing premature cure or scorch. These tendencies are the major reason that sulfenamide or "delayed action" accelerators have become so prominent as rubber accelerators. These materials, as a class, possess excellent resistance to scorch but they do not provide excellent resistance to aging and deterioration of the rubber product, thus making it necessary to use high levels of sulfur in order to obtain satisfactory cures. Many of these materials, as a class, also possess relatively low stability or shelf life, making it necessary to avoid protracted storage time before use.

It is an object of this invention to provide for both the sulfurless and sulfur vulcanization of rubber while resisting scorching. It is another object of this invention to provide for rubber products having a high resistance to deterioration by heat and oxidation. It is a further object of this invention to provide new compositions of matter which impart excellent resistance to scorch during the processing of the rubber and also impart high resistance to deterioration by heat and oxidation to the final rubber product. It is yet a further object of this invention to provide new compositions of matter having improved stability or shelf life. Other objects will become apparent as this description proceeds.

The present invention relates to new compositions of matter and their use singly or in mixture with each other in both the sulfurless and sulfur vulcanization of oxidizable, sulfurcurable rubbery polymers, which compositions correspond to the general formula

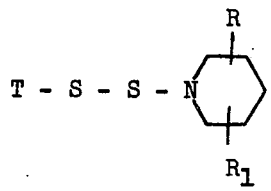

where R is selected from the group consisting of (1) alkyl radicals containing from 1 to 12 carbon atoms, (2) cycloalkyl radicals containing from 6 to 12 carbon atoms and (3) alkaryl radicals containing from 7 to 12 carbon atoms; $R_1$ is selected from the group consisting of hydrogen and a radical as defined by R above and wherein T is selected from the group consisting of tiazolyl, benzoxazolyl and benzimidazolyl radicals. The thiazolyl, benzothiazolyl, benzoxazolyl and benzimidazolyl radicals identified as T may be unsubstituted or substituted with one or more radicals selected from the group consisting of R as defined above and aryl radicals containing from 6 to 12 carbon atoms. Representative examples of the new compositions of matter corresponding to the general formula set forth above include:

2(2-methylpiperidinodithio)benzothiazole
2(3-methylpiperidinodithio)benzothiazole
2(4-methylpiperidinodithio)benzothiazole
2(2,4-dimethylpiperidinodithio)benzothiazole
2(2,5-dimethylpiperidinodithio)benzothiazole
2(2,6-dimethylpiperidinodithio)benzothiazole
2(3,5-dimethylpiperidinodithio)benzothiazole
2(3-ethyl-4-methylpiperidinodithio)benzothiazole
2(2-propylpiperidinodithio)benzothiazole
2(4-propylpiperidinodithio)benzothiazole
2(4-t-butylpiperidinodithio)benzothiazole
2(4-methyldiphenylpiperidinodithio)benzothiazole
2(4-benzylpiperidinodithio)benzothiazole
2(2-benzylpiperidinodithio)benzothiazole
2(3-cyclohexylpiperidinodithio)benzothiazole
2(3-methylpiperidinodithio)benzoxazole
2(3-methylpiperidinodithio)benzimidazole
2(4-ethylpiperidinodithio)benzimidazole
2(3-methylpiperidinodithio)4-isopropylthiazole
2(4-methylpiperidinodithio)4-methylthiazole
2(3-methylpiperidinodithio)4-phenylthiazole Preferred members of the class of compounds defined by the general formula above are those wherein R is an alkyl radical containing from 1 to 6 carbon atoms; $R_1$ is hydrogen and T is a benzothiazolyl radical. Representative examples of preferred members of this class of compounds include:

2(2-methylpiperidinodithio)benzothiazole
2(3-methylpiperidinodithio)benzothiazole
2(4-methylpiperidinodithio)benzothiazole
2(4-propylpiperidinodithio)benzothiazole As stated above, the new compositions of matter of this invention find use as both excellent delayed action accelerators and as curing agents in the vulcanization of rubber. These new compositions of matter thus possess the dual capacity of being able to reduce premature scorch or cure during processing and of being able to produce rubber products having high resistance to deterioration by heat and oxidation. The types of rubber compounds to which these new compositions of matter can be added include oxidizable, sulfur-curable rubbery polymers of conjugated diolefins, copolymers of conjugated diolefins, copolymers of conjugated diolefins and other copolymerizable monomers such as nitriles, monovinyl substituted aromatic hydrocarbons and terpolymers of lower alkyl alpha olefins and a diene monomer. Representative examples of the above oxidizable, sulfur-curable rubbery polymers, copolymers and terpolymers include natural rubber, cis-1,4-polybutadiene, polyisoprene, butyl rubber, butadiene/acrylonitrile copolymers, isoprene/acrylonitrile copolymer, butadiene/styrene copolymer, ethylene/propylene/diene monomer, terpolymers and the like.

The concentrations of the compositions of mattter of this invention are variable depending upon whether the rubber is to be cured with or without sulfur. Generally concentrations ranging from about 0.05 to about 10.0 parts by weight per 100 parts by weight of rubber are employed. For sulfur cured rubbers it is preferred to employ a concentration ranging from about 0.5 to about 2.0 parts by weight per 100 parts by weight of rubber and for sulfurless cured rubbers it is preferred to use a concentration ranging from about 2 parts to about 5 parts by weight per 100 parts by weight of rubber. The reason for the use of higher concentrations in sulfurless cured rubber is that a portion of the compositions of the present invention must now function as the curing agent. These compositions can be incorporated into the rubber by any of the well known techniques known in the art.

It is obvious that the compositions of matter of the instant invention may be used in rubbers compounded with any of the customarily used rubber compounding ingredients in proportions well known in the art. Such compounded rubbers may contain any of the well known fillers such as carbon blacks, metal oxides and the like; softeners such as fatty acids, oil, soaps and the like; antioxidants such as one or more of the well known amines and/or phenolic antioxidants; activators such as metallic oxides, fatty acids and the like; acidic retarders such as organic acids and anhydrides; basic retarders such as nitrosoamines, alkali metal salts of acids and the like and any of the other customary compounding ingredients used in the art, including, of course, sulfur.

The preparation of the compositions of matter of the present invention and the efficacy of their use in the vulcanization of rubber are illustrated by reference to the following examples which are intended to be representative rather than restrictive of the scope of the invention.

EXAMPLE 1

A solution was prepared comprising 34.0 grams (0.1 mol) of 98% 2,2'-dithiobisbenzothiazole, 6.72 grams (0.210 mol) of sulfur, 22.0 grams (0.22 mol) of 2-methylpiperidine and 100 milliliters of ethanol in a 4-neck flask fitted with a dropping funnel, stirrer, reflux condenser and thermometer. With continuous stirring the solution was heated to reflux, cooled to 60° C. and 56.7 milliliters (0.12 mol) of 2.12 N sodium hypochlorite added over a period of 2 minutes. The reaction mixture was maintained at reflux temperatures for about 10 minutes. The reaction mixture was then filtered hot to remove any unreacted 2,2'-dithiobisbenzothiazole. The filtrate was then cooled and water added to give a weight percent yield of 58% of 2(2-methylpiperidinodithio)benzothiazole. The crude product was an oil. This oil was then dissolved in hexane solvent and washed with a dilute aqueous solution of acetic acid followed by several water washes. The hexane layer containing the product was then dried over magnesium sulfate, filtered and the hexane removed by evaporation at room temperatures.

EXAMPLE 2

A preparation similar to Example 1 was carried out except 22.0 grams (0.22 mol) of 3-methylpiperidine was substituted for the 2-methylpiperidine employed in Example 1. After washing and drying the reaction product in the same manner as described in Example 1 above there was isolated the 74% by weight yield of pure 2(3-methylpiperidinodithio)benzothiazole. Analysis: calculated for $C_{13}H_{16}N_2S_3$: S, 32.45; N, 9.45. Found: S, 31.20; N, 9.15.

EXAMPLE 3

A solution was prepared comprising 34.0 grams (0.1 mol) of 98% 2,2'-dithiobisbenzothiazole, 6.72 grams (0.21 mol) of sulfur, 22.0 grams (0.22 mol) of 4-methylpiperidine in 100 milliliters of isopropanol. After heating this solution for 5 minutes at reflux temperatures with constant agitation it was cooled to 55° C. and 56.7 milliliters (0,12 0.12 mol) of 2.12 N sodium hypochlorite was added over a period of five minutes. The reaction mixture was maintained to 70° C. for an additional five minutes. At the end of this time it was filtered hot to remove any unreacted 2,2'-dithiobisbenzothiazole and the filtrate cooled. Cold water was then added to this filtrate to precipitate the product. There was obtained a 75% by weight yield of 2(4-methylpiperidinodithio)benzothiazole. After recrystallization from alcohol this product was found to have a melting range of 90° to 100° C. Analysis: Calculated for $C_{13}H_{16}N_2S_3$: S, 32,45; N, 9.45. Found: S, 32.45; N, 9.38.

EXAMPLE 4

A preparation similar to Example 1 was carried out except that 25.4 grams of 4-n-propylpiperidine was substituted for the 2-ethylpiperidine employed therein. There was obtained a 98.2% yield of 2(4-n-propylpiperidinodithio)benzothiazole. This product, an amber oil, was washed and dried in the same manner as described in Example 1.

EXAMPLE 5

The efficacy of the compositions of matter of this invention is illustrated by the following tests wherein the indicated compositions of matter of this invention were added to the following standard rubber formulation:

|  | Parts by Weight |
| --- | --- |
| Smoked sheet | 100.0 |
| H.A.F. black | 50.0 |
| Zinc oxide | 3.0 |
| Stearic acid | 3.0 |
| Aromatic processing oil | 3.0 |
| Mixtures of diaryl-p-phenylenediamines | 1.0 |

To four separate stocks of the above standard rubber formulation were added 4.0 parts by weight per 100 parts by weight rubber (phr) of the compositions of matter of this invention. Two additional stocks were prepared employing known disulfides. The stocks prepared in this manner were as follows:

| STOCK | COMPOSITION OF MATTER |
| --- | --- |
| A | 2(4-morpholinodithio)benzothiazole |
| B | 2(piperidinodithio)benzothiazole |
| C | 2(4-methylpiperidinodithio)benzothiazole |
| D | 2(3-methylpiperidinodithio)benzothiazole |
| E | 2(2-methylpiperidinodithio)benzothiazole |
| F | 2(4-propylpiperidinodithio)benzothiazole |

Stocks A and B were employed as control stocks.

Mooney scorch tests were performed as described in ASTM D1646–68 using the large 1½ inch rotor. The samples were allowed to preheat for 1 minute before starting the motor. The dial reading was taken continuously until the dial indicated a five point rise above the lower dropback reading. The time required to produce this change is recorded as the scorch time.

Dumbbell samples were cut from cured sheets of the standard rubber stock containing the compositions of matter of this invention as outlined in ASTM D 412–68, the cure being at the customary 275° F. for 30 minutes. The table below contains all data concerning scorch times, modulus, ultimate tensile and elongation at break.

TABLE I

| Stock | A | B | C | D | E | F |
|---|---|---|---|---|---|---|
| Mooney scorch at 250°F.; Minutes to 5 point rise | 27.2 | 21.7 | 25.5 | 22.5 | 15.5 | 21.6 |
| 300% Modulus | 1225 | 1950 | 1800 | 1825 | 1850 | 1850 |
| Ult. Tensile | 3200 | 3775 | 3875 | 3700 | 3825 | 3825 |
| Elongation at Break | 620 | 550 | 600 | 550 | 430 | 565 |

The data illustrate that the compositions of matter of this invention, in the absence of free sulfur, are effective as curing agents as well as excellent delayed action accelerators.

EXAMPLE 6

A series of tests was carried out similar to those of Example 5 above except that 2.5 phr of sulfur was added to the above standard rubber formulation and 0.5 phr rather than 4.0 phr of the compositions of matter of this invention were employed. The stocks prepared for this series of tests and the compositions of matter employed were as follows:

| STOCK | COMPOSITION OF MATTER |
|---|---|
| G | 2(4-morpholinodithio)benzothiazole |
| H | 2(piperidinodithio)benzothiazole |
| I | 2(4-methylpiperidinodithio)benzothiazole |
| J | 2(2-methylpiperidinodithio)benzothiazole |
| K | 2(4-propylpiperidinodithio)benzothiazole |

Pertinent data are set forth in the following table. Stocks G and H were employed as controls.

TABLE II

| Stock | G | H | I | J | K |
|---|---|---|---|---|---|
| Mooney Scorch at 250°F.; Minutes to 5 point rise | 27.3 | 21.5 | 21.8 | N.D.* | 21.8 |
| 300% Modulus | 1950 | 2500 | 2400 | 2600 | 2250 |
| Ult. Tensile | 3800 | 3875 | 4000 | 4000 | 3825 |
| Elongation at break | 550 | 525 | 530 | 540 | 550 |

*Not Determined

The above data illustrate the effectiveness of the new compositions of matter in Stocks I, J and K as effective nonscorching, delayed action accelerators in the sulfur vulcanization of rubbers.

EXAMPLE 7

A series of tests were carried out wherein the indicated compositions of matter of this invention were added to the following standard rubber formulation:

|  | Parts by Weight |
|---|---|
| Oil extended SBR | 68.75 |
| Polybutadiene | 50.00 |
| ISAF black | 50.00 |
| Zinc oxide | 3.00 |
| Stearic acid | 2.00 |
| Aromatic processing oil | 10.00 |
| Wax | 3.00 |
| Mixtures of diaryl-p-phenylenediamines | 1.50 |
| Diphenylguanidine | 0.75 |
| Sulfur | 1.50 |

To four separate stocks of the above standard rubber formulation were added the following compositions of matter:

| STOCK | COMPOSITION OF MATTER | Parts by Weight |
|---|---|---|
| L | 2-(piperidinodithio)benzothiazole | 0.65 |
| M | 2-(4-methylpiperidinodithio)benzothiazole | 0.65 |
| N | 2-(3-methylpiperidinodithio)benzothiazole | 0.65 |
| O | 2,2'-dithiobisbenzothiazole | 0.85 |

Stocks L and O were employed as control stocks. Each of the above stocks was divided in half with one half being cured at 275° F. for 32 minutes and the other half being cured at 275° F. for 64 minutes. Mooney scorch tests, modulus, ultimate tensile and elongation at break were well carried out in the same manner as in Example 5. All pertinent data are contained in the table below.

TABLE III

| Stock | L | M | N | O |
|---|---|---|---|---|
| Mooney scorch at 250°F.; Minutes to 5 point rise | 39.5 | 40.5 | 42.5 | 35.5 |
| 300% Modulus |  |  |  |  |
| 32 min. cure | 520 | 510 | 450 | 525 |
| 64 min. cure | 460 | 500 | 430 | 500 |
| Ult. Tensile |  |  |  |  |
| 32 min. cure | 2400 | 2350 | 2300 | 2400 |
| 64 min. cure | 2350 | 2250 | 2200 | 2300 |
| Elongation at Break |  |  |  |  |
| 32 min. cure | 800 | 800 | 840 | 810 |
| 64 min. cure | 840 | 800 | 835 | 810 |

In the following table the above stocks were aged for seven hours in an air bomb with the pressure at 80 pounds per square inch at a temperature of 236° F.

TABLE IV

| Stock | L | M | N | O |
|---|---|---|---|---|
| 300% Modulus; | | | | |
| 32 min. cure | 650 | 610 | 600 | 670 |
| 64 min. cure | 570 | 530 | 500 | 560 |
| Ult. Tensile | | | | |
| 32 min. cure | 2100 | 2100 | 2100 | 2080 |
| 64 min. cure | 1950 | 2000 | 1950 | 2000 |
| Elongation at Break | | | | |
| 32 min. cure | 710 | 745 | 760 | 700 |
| 64 min. cure | 730 | 720 | 790 | 760 |

Although this test is quite severe these data further illustrate the capacity of the compositions of the present invention to function as both delayed action accelerators and as curing agents equivalent to or better than the control materials.

EXAMPLE 8

To demonstrate the superior stability or shelf life of the compositions of the present invention, samples of 2(3-methylpiperidinodithio)benzothiazole (3MPDB), 2(4-methylpiperidinodithio)benzothiazole (4MPDB) and the known accelerator, 2-(piperidinothio)benzothiazole (PDB), were stored for 30 months at room temperature (R.T.). At the end of this time two gram samples of each of the above materials were tested for purity, which indicates the stability or shelf life of these materials, in accordance with the method described by J. G. Lichty, *Industrial & Engineering Chemistry* (Prod. Res. Develop.) 2, No. 1, p. 21 (March 1963). The table below sets forth all pertinent data.

TABLE V

| | Purity, Weight % | |
|---|---|---|
| Compound | Original | After 30 Months Storage at R. T. |
| PDB | 98.5 | 29.0 |
| 3MPDB | 96.3 | 93.4 |
| 4 MPDB | 93.5 | 77.9 |

While certain representative embodiments and details have been shown for the purpose of illustrating the invention it will be apparent to those skilled in this art that various changes and modifications may be made therein without departing from the spirit or scope of the invention.

What I claim is:
1. The composition of matter, 2(4-methylpiperidinoditho)benzothiazole.
2. The composition of matter, 2(3-methylpiperidinodithio)benzothiazole.
3. The composition of matter, 2(2-methylpiperidinodithio)benzothiazole.
4. The composition of matter, 2(4-propylpiperidinodithio)benzothiazole.

* * * * *